United States Patent [19]
Ward

[11] 3,887,630
[45] June 3, 1975

[54] ISOMERIZATION OF ALKYL AROMATIC HYDROCARBONS
[75] Inventor: John W. Ward, Yorba Linda, Calif.
[73] Assignee: Union Oil Company of California, Los Angeles, Calif.
[22] Filed: Feb. 4, 1974
[21] Appl. No.: 439,578

[52] U.S. Cl. ....... 260/668 A; 260/672 T; 252/455 Z
[51] Int. Cl. ............................................. C07c 15/02
[58] Field of Search .................... 260/668 A, 672 T; 252/455 Z

[56] References Cited
UNITED STATES PATENTS
3,293,192  12/1966  Maher et al. ......................... 252/455
3,525,775   8/1970  Bolton et al. ........................ 260/668
3,548,020  12/1970  Gutberlet et al. .................... 260/672
3,562,342   2/1971  Hebert et al. ........................ 260/668

Primary Examiner—Delbert E. Gantz
Assistant Examiner—C. E. Spresser
Attorney, Agent, or Firm—Lannas S. Henderson; Richard C. Hartman; Dean Sandford

[57] ABSTRACT

Alkyl aromatic hydrocarbons are isomerized using a unique stabilized hydrogen Y zeolite catalyst prepared by a sequence of (1) partial ammonium ion exchange of sodium Y zeolite, (2) steam calcination of the partially exchanged zeolite, preferably at relatively high temperatures, (3) further ammonium ion exchange to reduce the sodium content to a very low level, and (4) a second calcination at relatively low temperatures.

10 Claims, No Drawings

ISOMERIZATION OF ALKYL AROMATIC HYDROCARBONS

BACKGROUND AND SUMMARY OF INVENTION

A great variety of catalysts have previously been suggested for effecting the isomerization of alkyl aromatic hydrocarbons such as xylenes, etc. Most of the older catalysts comprise halided Friedel-Craft type components which give rise to corrosion and other problems. More recently, several forms of Y zeolite catalysts have been suggested for this purpose, thereby avoiding the halide corrosion problem. For example, U.S. Pat. No. 3,576,895 discloses various forms of rare earth and hydrogen Y zeolites. U.S. Pat. No. 3,562,342 discloses a type of Y zeolite catalyst prepared by a double ammonium ion exchange procedure with intervening and final calcination steps, wherein the intervening calcination is conducted at a relatively low temperature and apparently in the absence of steam, while the final calcination is conducted at a higher temperature of 1,500°F. I have now discovered that a much more active catalyst of this general type is obtained if the intervening calcination is conducted at relatively high temperatures in the presence of steam, and the final calcination is conducted at temperatures below about 1,200°F. This procedure not only produces a catalyst of much higher isomerization activity than any other type of Y zeolite catalyst of which I am aware, but also results in a product which is hydrothermally stable.

Briefly summarizing, the critical steps in the manufacture of the super-active zeolites of my invention are as follows:

1. The initial sodium Y zeolite is subjected to a preliminary ammonium ion exchange to replace most, but not all, of the zeolitic sodium with ammonium ions.
2. The resulting ammonium-sodium zeolite is then calcined in the presence of steam at temperatures above about 900°F but below the temperature at which appreciable thermal destruction of crystallinity occurs.
3. The steam calcined zeolite is then reexchanged with ammonium salt to replace at least about 25 percent, and preferably at least 50 percent, of the remaining sodium with ammonium ions.
4. The reexchanged zeolite is then again calcined, but at temperatures below about 1,200°F for a time sufficient to effect deammoniation without substantial dehydroxylation.

The resulting zeolites can either be used as such, or with an added hydrogenating metal plus hydrogen to effect isomerization and/or disproportionation of any desired alkyl aromatic hydrocarbon, or mixtures thereof. As employed hereinafter in the claims, the term "isomerization" is intended to cover both isomerization and disproportionation.

DETAILED DESCRIPTION

The initial sodium Y zeolite starting material utilized herein ordinarily has a $SiO_2/Al_2O_3$ mole-ratio between about 3 and 6, and contains about 10 – 14 weight-percent of sodium as $Na_2O$. In the initial ammonium ion exchange step, the sodium zeolite is digested in conventional manner with an aqueous solution of a suitable ammonium salt such as the chloride, nitrate, sulfate, carbonate, acetate, etc. to replace at least about 50 percent but not more than about 95 percent of the original sodium ions with ammonium ions. The sodium content should be reduced to about 1 – 5 percent, preferably about 1.5 – 4 percent by weight as $Na_2O$. To reduce the sodium level to this value it may be desirable to employ two or more stages of exchange treatments.

Following the initial exchange treatment, I have found that in order to produce a composition having the desired properties outlined above, it is essential that the ammonium-sodium zeolite at this stage be calcined in the presence of steam. For best effect the calcination should be carried out while maintaining at least about 1 psi water vapor pressure, and preferably about 5 – 15 psi. This objective can be realized by any procedure capable of maintaining the desired water vapor partial pressure in contact with the zeolite during at least the initial stages of heating at above about 900°F. In one modification, the wet zeolite from the exchange step can merely be heated in a covered container so as to retain the water vapor generated therefrom. Alternatively, the zeolite can be introduced into a batch or continuous rotary furnace, or a static bed calcination zone, into which preheated steam or humidified air is introduced. Still another alternative is to heat the wet zeolite, with or without added water, in an autoclave such that superatmospheric pressures of steam can be maintained.

Operative steaming temperatures range between about 900° and 1,650°F, preferably between about 1,100° and 1,500°F. In any case, the factors of time, temperature and steam partial pressure should be correlated so as to effect a limited shrinkage in unit cell size, yet avoid substantial thermal degradation of the crystal structure. The duration of treatment is usually at least about 0.5 minutes, preferably about 30 minutes to about 4 hours, but in any event is sufficient to reduce the unit cell size to between about 24.30 and 24.64 A, preferably between about 24.40 and 24.64 A. This reduction in unit cell size presages an optimum combination of activity and hydrothermal stability achievable in the final product.

The steam calcined zeolite is then reexchanged with ammonium salt solution under sufficiently severe conditions to (1) replace at least about 25 percent, preferably at least about 50 percent, of the remaining zeolitic sodium with ammonium ions, and (2) to reduce the remaining zeolitic sodium content of the zeolite to less than about one weight-percent, preferably less than about 0.5 weight-percent, as $Na_2O$.

It should be realized that this second exchange step does not introduce any appreciable amount of ammonium ions into the exchange sites which were dehydroxylated in the previous steam calcination step; nearly all of the ammonium ions which go into the zeolite at this point do so by replacing remaining sodium ions. For maximum isomerization activity, it is believed that a substantial ammonium zeolite moiety is desirable in the final calcination step for conversion to hydroxylated, or Bronsted acid sites. It will hence be apparent that sufficient sodium should be initially present in the zeolite subjected to the second exchange step, and that sufficient of this remaining sodium should be exchanged out with ammonium ion, to provide the desired quantum of Bronsted acidity precursor. For this purpose, the double-exchanged zeolite should contain an amount of ammonium ion corresponding to at least about 5 relative percent, preferably 10–20 percent, of the original ion exchange capacity of the zeolite. While this remaining ion exchange capacity may appear to represent only a small proportion of the original, potentially active sites, it is believed that these remaining exchange sites are mostly located in the more accessible portions of the crystal structure.

To generate maximum activity from the double-exchanged zeolite prepared as above described, careful control should be maintained over conditions prevailing during the final calcination step. The overall objective is to effect substantially complete deammoniation without effecting substantial dehydroxylation or further shrinkage in the unit cell size. Operative temperatures range between about 700° and 1,200°F, preferably between about 800° and 1,025°F. The calcination is preferably conducted in a flowing stream of dry or humidified air, and may be regarded as complete as soon as the off-gases become free of ammonia. The time required for completion will of course vary with the temperature, and will normally range between about 10 minutes and 12 hours or more. In the non-preferred temperature range between 1,025° and 1,200°F it is preferred to maintain a substantial partial pressure of steam in order to suppress dehydroxylation. Dehydroxylation rates become appreciable only at temperatures above about 1,000°F.

Prior to the final calcination step, preferably following the second exchange step, the zeolite component may be intimately admixed with a finely divided, hydrous, refractory oxide of a difficultly reducible metal, which serves as a binder, and in some cases appears to contribute other desirable characteristics to the final catalyst. The term "hydrous" is used to designate oxides having structural surface hydroxyl groups detectable by infra red analysis. The preferred oxides are alumina, silica, magnesia, beryllia, zirconia, titania, thoria, chromia, and combinations thereof such as silica-alumina, silica-magnesia and the like. Naturally occurring clays comprising silica and alumina may also be utilized, preferably after acid treatment. The resulting mixtures may contain between about 0.5 and 98 weight-percent of zeolite, preferably at least about 2 weight-percent, and generally about 20 to about 80 weight-percent, based on the combined dry weight of the zeolite and the metal oxide. The metal oxide can be combined with the zeolite as a hydrous sol or gel, as an anhydrous activated gel, a spray dried powder or a calcined powder. In one modification a sol or solution of the metal oxide precursor such as an alkali metal silicate or aluminate can be precipitated to form a gel in the presence of the zeolite.

After admixing the hydrous oxide with the zeolite component, it is normally preferable at this point to form the mixture into the shape desired for the final catalyst. Conventional tableting, prilling, or extruding procedures may be utilized to produce tablets, prills or extrudate pellets having a diameter of about one thirty-second inch to three-eighths inch. Other conventional pelleting aids may be added such as lubricants, binders, diluents, etc. After pelleting, the zeolite composition is then subjected to the critical second calcining step described above.

The stabilized zeolite produced as above described may be used as such, i.e., without an added hydrogenating promoter. However, under severe isomerization conditions which tend to lay down excessive coke, an added hydrogenating promoter may be used. Effective hydrogenation components comprise the Group VIB and/or Group VIII metals and their oxides and/or sulfides, with or without other metals such as rhenium. Operative proportions (based on free metal) may range between about 0.05 and 30 percent by weight, depending upon the type of metal or metals selected, and the desired activity. In the case of the Group VIII noble metals, amounts in the range of about 0.1 – 2 percent are preferred. The iron group metals, iron, cobalt and nickel, are normally utilized in proportions of about 1–10 weight-percent; the Group VIB netals in proportions of about 3–20 weight-percent. Preferred hydrogenating metals are palladium, platinum, nickel, cobalt, tungsten and molybdenum. Particularly preferred are palladium, or combinations of nickel and/or cobalt with molybdenum and/or tungsten. Conventional impregnation and/or ion exchange procedures are the preferred methods for adding the hydrogenating metals.

The finished catalysts may be utilized for the isomerization of any desired alkyl aromatic hydrocarbon, or non-equilibrium mixtures thereof. Ortho-xylene and/or metaxylene may be isomerized to produce near-equilibrium mixtures comprising para-xylene. Trimethylbenzenes may be disproportionated to produce mixtures comprising toluene, xylenes and tetramethyl benzenes. Toluene may be disproportionated to form mixtures of benzene and xylenes. Alpha-methylnaphthalene may be isomerized to mixtures of alpha- and beta-methylnaphthalenes. These and other isomerization reactions are well known in the art.

Effective isomerization conditions are also well known in the art, and hence need not be described in detail. Effective temperatures range between about 300° and 850°F, preferably between about 400° and 700°F. Liquid hourly space velocities range between about 0.1 and 10, usually about 0.5 – 5. Atmospheric pressures are normally utilized when hydrogen is not necessary. If hydrogenative coke suppression is desired, hydrogen pressures in the lower ranges of about 200 – 500 psi are utilized in order to avoid hydrogenation of the aromatic nuclei. Since the catalysts of this invention are very active cracking catalysts, temperatures in the lower ranges cited above should be utilized in the case of alkyl aromatics having side chains containing more than one carbon atom. Low temperatures should likewise be utilized when it is desired to suppress disproportionation, and conversely the higher temperature ranges are preferable where disproportionation is desired.

The following Examples are cited to further illustrate the invention:

EXAMPLE 1

A catalyst of this invention was prepared as follows:

A sample of Linde sodium Y zeolite was ion exchanged with ammonium nitrate solution to a sodium level of about 1.7 weight-percent $Na_2O$. The zeolite was then calcined in a steam atmosphere at about 1,290°F for one hour. The resulting zeolite was then further exchanged with ammonium nitrate solution until the sodium oxide content was 0.1 weight-percent. The product was then later calcined in a substantially dry atmosphere of helium at 900°F for three hours. The resulting product was hydrothermally stable.

EXAMPLE 2

Another catalyst was prepared as described in Example 1, with the exception that the product from the second ion exchange was calcined for 2 hours at 1,100°F in steam (to suppress dehydroxylation).

EXAMPLE 3

Another catalyst was prepared as described in Example 2, with the exception that the final calcination was carried out at about 1,300°F.

EXAMPLE 4

Another catalyst was prepared as described in Example 2, with the exception that the final calcination was carried out at about 1,475°F.

EXAMPLE 5

A magnesium stabilized Y zeolite was prepared as follows:

Linde sodium Y zeolite was ion exchanged with ammonium nitrate solution to a sodium level of about 1.8 weight-percent $Na_2O$. The zeolite was then reexchanged with a magnesium nitrate solution to produce a final catalyst containing 4.5 weight-percent MgO. The product was then later calcined in helium at 900°F for three hours, and was hydrothermally stable.

EXAMPLE 6

A rare earth Y zeolite was prepared as follows:

An ammonium Y zeolite containing about 1.8 weight-percent $Na_2O$ was reexchanged with a solution of rare earth metal chlorides (comprising principally cerium and lanthanum) so that the final product contained 10.3 weight-percent rare earth metal oxides. After calcination as described in Example 1, this product was likewise hydrothermally stable.

EXAMPLE 7

A sample of ultrastable Y zeolite, US 14, was obtained from W. R. Grace Company. It contained 0.3 weight-percent sodium oxide, and reportedly was prepared by a double ammonium ion exchange procedure with an intervening and final calcination, the intervening calcination being carried out at about 1,000°F in the substantial absence of steam, and the final calcination being carried out at about 1,650°F.

EXAMPLE 8

Linde sodium Y zeolite was repeatedly ion exchanged with ammonium nitrate solution until it had a residual sodium oxide content of 0.1 weight-percent, and finally calcined in helium at 900°F for three hours. This product was identical in sodium content with product of Example 1, but was not hydrothermally stable.

EXAMPLE 9 — ACTIVITY TESTING

Each of the foregoing catalysts were activity tested for the isomerization of ortho-xylene to a mixture of meta- and para-xylene. In each case one gram of the catalyst in the form of 20 - 40 mesh granules was placed in a micro-reactor in which the final calcination was performed (for the zeolites of Examples 1, 5, 6, 7 and 8) by heating the sample in a stream of helium at 900°F for the three hours. The catalyst temperature was then reduced to about 400°F, and the helium stream was diverted, at a flow rate of 50 ml/minute, through a saturator containing ortho-xylene thermostated at 20°C, the resulting xylene-saturated gas stream then being preheated and passed through the reactor. Activities were measured by observing via gas chromatography the conversion of ortho-xylene to a mixture and meta- and para-xylenes. Conversions were determined in each case at several temperatures ranging between about 350° - 550°F, which gave conversions running generally between about 8 - 30 percent. Assuming first order kinetics, rate constants were calculated at each reaction temperature and from resulting Arrhenius plots, rate constants at 500°F were determined. The results were as follows:

Table 1

| Catalyst | Final Calcination Temp., °F | Rate Constant at 500°F |
| --- | --- | --- |
| Example 1 | 900 | 246 |
| 2 | 1100 | 151 |
| 3 | 1300 | 79 |
| 4 | 1475 | 69 |
| 5 | 900 | 39 |
| 6 | 900 | 31 |
| 7 | 1650 then 900 | 53 |
| 8 | 900 | 51 |

The effect of final calcination temperature upon activity is readily apparent from the results obtained with the catalysts of Examples 1 - 4. The prior art catalysts of Example 5 - 8 are obviously much inferior to catalysts of this invention (Examples 1 and 2).

EXAMPLE 10

Alumina-diluted analogs of the catalysts of Examples 1, 5, 6, 7 and 8 above were prepared as follows:

In each instance, prior to the final calcination at 900°F, the respective zeolite was admixed with an equal weight of Kaiser SAS gamma alumina, then cast into tablets and calcined in air at 900°F for 2 hours. Activity testing of the final product as described in Example 9, gave the following results:

Table 2

| Catalyst | | Final Calcination Temp., °F | Rate Constant at 500°F |
| --- | --- | --- | --- |
| Example 1 | + $Al_2O_3$ | 900 | 91.2 |
| 5 | do. | 900 | 13.7 |
| 6 | do. | 900 | 13.9 |
| 7 | do. | (1) | 11.8 |
| 8 | do. | 900 | 57.4 |

(1) 1650°F prior to addition of $Al_2O_3$; 900°F after addition.

It will be apparent from the foregoing that alumina dilution reduces activity of all the catalysts except that of Example 8. This catalyst however is not hydrothermally stable. Of the hydrothermally stable catalysts, the superiority of the catalyst of this invention (Example 1) over the prior art catalysts of Examples 5, 6 and 7 is strikingly apparent.

The following claims and their obvious equivalents are intended to define the true scope of the invention.

I claim:

1. A process for the isomerization of alkyl aromatic hydrocarbons which comprises subjecting such hydrocarbon, or non-equilibrium mixtures thereof, to isomerization conditions in contact with a catalyst comprising as its essential active ingredient a hydrothermally stable Y zeolite prepared by the steps of:

1. subjecting an ammonium-sodium Y zeolite containing between about 1–5 weight-percent Na$_2$O to calcination in the presence of steam at temperatures above about 900°F but below the temperature at which appreciable thermal destruction of crystallinity occurs;
2. subjecting the resulting product to further ammonium ion exchange to replace at least about 25 percent of the zeolitic sodium ions with ammonium ions; and
3. calcining the resulting product at a temperature between about 700° and 1,200°F for a time sufficient to effect deammoniation without substantial dehydroxylation.

2. A process as defined in claim 1 wherein step (3) is carried out at a temperature between about 800° and 1,025°F.

3. A process as defined in claim 1 wherein said alkyl aromatic hydrocarbon comprises at least one xylene isomer.

4. A process as defined in claim 3 wherein step (3) is carried out at a temperature between about 800° and 1,025°F.

5. A process as defined in claim 1 wherein said contacting is carried out in the presence of added hydrogen, and said catalyst contains a catalytically effective proportion of at least one Group VIII metal.

6. A process for the isomerization of alkyl aromatic hydrocarbons which comprises subjecting such hydrocarbon, or non-equilibrium mixtures thereof, to isomerization conditions in contact with a catalyst comprising as its essential active ingredient a hydrothermally stable Y zeolite prepared by the steps of:

1. subjecting an ammonium-sodium Y zeolite containing between about 1.5 and 4 weight-percent sodium as Na$_2$O to calcination at a temperature between about 1,100° and 1,500°F in contact with at least about one psi of water vapor pressure, and continuing said calcination for a time sufficient to reduce the unit cell size of said zeolite to between about 24.30 and 24.64 Å;
2. subjecting the resulting product to further ammonium ion exchange to replace at least about 50 percent of the zeolitic sodium ions with ammonium ions; and
3. calcining the exchanged product from step (2) at a temperature between about 700° and 1,200°F for a time sufficient to effect deammoniation without substantial dehydroxylation or further shrinkage in unit cell size.

7. A process as defined in claim 6 wherein step (3) is carried out at a temperature between about 800° and 1,025°F.

8. A process as defined in claim 6 wherein said alkyl aromatic hydrocarbon comprises at least one xylene isomer.

9. A process as defined in claim 8 wherein step (3) is carried out at a temperature between about 800° and 1,025°F.

10. A process as defined in claim 6 wherein said contacting is carried out in the presence of added hydrogen, and said catalyst contains a catalytically effective proportion of at least one Group VIII metal.

* * * * *